US010565402B2

(12) United States Patent
Bortz et al.

(10) Patent No.: US 10,565,402 B2
(45) Date of Patent: Feb. 18, 2020

(54) SYSTEM AND METHOD FOR SERVING ONLINE SYNCHRONIZED CONTENT FROM A SANDBOX DOMAIN VIA A TEMPORARY ADDRESS

(71) Applicant: Dropbox, Inc., San Francisco, CA (US)

(72) Inventors: Andrew Bortz, San Francisco, CA (US); Bo Hu, San Francisco, CA (US); David Goldstein, San Francisco, CA (US); Alex Allain, San Francisco, CA (US); Emil Ibrishimov, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 1379 days.

(21) Appl. No.: 14/513,841

(22) Filed: Oct. 14, 2014

(65) Prior Publication Data

US 2016/0103801 A1    Apr. 14, 2016

(51) Int. Cl.
*G06F 17/22* (2006.01)
*G06F 40/134* (2020.01)
*H04L 29/08* (2006.01)
*G06F 16/955* (2019.01)
*H04L 29/06* (2006.01)

(52) U.S. Cl.
CPC ........ *G06F 40/134* (2020.01); *G06F 16/9558* (2019.01); *H04L 67/2814* (2013.01); *H04L 63/08* (2013.01); *H04L 67/02* (2013.01); *H04L 67/146* (2013.01)

(58) Field of Classification Search
CPC .................................................. G06F 17/2235
See application file for complete search history.

(56) References Cited

U.S. PATENT DOCUMENTS

| 7,870,596 | B2 * | 1/2011 | Schackow | H04L 63/20 709/217 |
| 8,613,070 | B1 * | 12/2013 | Borzycki | G06F 21/6218 726/8 |
| 10,037,310 | B1 * | 7/2018 | Marra et al. | G06F 17/2235 |
| 2006/0230333 | A1 * | 10/2006 | Racovolis | G06F 17/2241 715/205 |
| 2011/0173547 | A1 * | 7/2011 | Lewis | H04L 12/581 715/752 |

(Continued)

*Primary Examiner* — James J Debrow
(74) *Attorney, Agent, or Firm* — Polsinelli PC

(57) ABSTRACT

Systems, methods, and non-transitory computer-readable storage media for serving content stored in an online synchronized content management system from a sandbox domain via a temporary address. The online synchronized content management system may receive a first request from a user to access a content item stored in the system. The first request may be received at a first domain via a first address that is directed to the first domain. The system may generate a second address that is directed to a second domain such as a sandbox domain. Then, the second address can be associated with the content item for direct access. When the system receives, at the second domain via the second address, a second request to access the content item, the content item can be served from the second domain. After the system receives the second request, it can generate and issue a session identifier for the second address to verify any subsequent requests to access the content item via the second address.

20 Claims, 8 Drawing Sheets

(56) References Cited

U.S. PATENT DOCUMENTS

| | | | | |
|---|---|---|---|---|
| 2011/0276863 | A1* | 11/2011 | Bhise | G06F 17/30905 |
| | | | | 715/201 |
| 2011/0289156 | A1* | 11/2011 | Pirnazar | G06F 17/30873 |
| | | | | 709/206 |
| 2012/0204250 | A1* | 8/2012 | Anderson et al. | G06F 17/21 |
| 2014/0189813 | A1* | 7/2014 | Stollman | H04L 63/08 |
| 2017/0331843 | A1* | 11/2017 | Sandke et al. | G06F 21/53 |

* cited by examiner

SYSTEM AND METHOD FOR SERVING ONLINE SYNCHRONIZED CONTENT FROM A SANDBOX DOMAIN VIA A TEMPORARY ADDRESS

TECHNICAL FIELD

The present technology pertains to online synchronized content management systems, and more specifically pertains to an improved technique for securely serving content from online synchronized content management systems.

BACKGROUND

An online synchronized content management system, such as Dropbox™ from Dropbox Inc. of San Francisco, Calif., allows its users to store and synchronize data on a cloud-based storage and across multiple client devices. Such services allow a user to easily share content with others by allowing the user to upload personal files and folders to the content management system and sharing links to those content items with people that the content owner wishes to share with. The link can be an address, such as a uniform resource locator (URL), that points to the location of a shared content item on the network and sometimes enables direct access to that content item. Thus, those who receive the sharing link can download or otherwise access the shared content item by simply interacting with the link.

However, using links or addresses to share content can introduce potential security vulnerabilities. First, user-uploaded content can contain malicious code that may compromise the integrity of the online content management system. Specifically, users may maliciously or unwittingly upload files that are infused with code (e.g., a virus, a Trojan horse, malware, etc.) that is designed to attack the system by undermining the content management system's security infrastructure and surreptitiously destroying, extracting, and/or sabotaging data. The malicious code can also disable or deny part of the service. In addition, the malicious code can exploit or commandeer the system for use that is inconsistent with the system's original design.

Furthermore, allowing the use of links or addresses to share data stored in an online synchronized content management system may have other unintended consequences such as an increased risk of the link leaking to unauthorized users. For example, through the use of an HTTP referrer (also known as "HTTP referer") header field, the address of the referring page (i.e., the previous webpage from which a link was followed) may be revealed to an entity that receives an HTTP request. Thus, if a sharing link points to a content item that contains another link, and a user clicks on the second link to issue an HTTP request, even if the receiving entity of the HTTP request was not meant to be given access to the content item, the entity may now have ambient authority over that content item simply because the sharing link has now been revealed to the entity.

As an example, Janet, an employee at Company A may want to share with David, her colleague at Company A, a portable document format (PDF) document containing confidential information about their competitor, Company B. The PDF document details Company A's future plans and strategies for competing with Company B's products. One portion of Janet's document lists Company B's product line and contains a direct URL link to Company B's website (e.g., www.company-b.com/products). Janet shares the PDF document with David by uploading the document to an online content management system and giving David a sharing link issued by the online content management system (e.g., myonlinecontent.com/F8GZ3/confidential.pdf). Using his web browser, David navigates to the sharing link and accesses the confidential PDF document inside his web browser. David peruses through the section about Company B's product line and discovers the link to Company B's website conveniently embedded into the PDF document. When David clicks on the link, his web browser sends out an HTTP request to Company B's website to retrieve the appropriate webpage. However, unbeknownst to David, the HTTP request to www.company-b.com contains an HTTP referer header that identifies the sharing link (i.e., myonlinecontent.com/F8GZ3/confidential.pdf) as the referrer. Thus, now that the sharing link is revealed to Company B through its website, Company B can use the link to access Company A's confidential PDF document about Company B. In this example, it was clearly not Janet or David's intention to share the confidential document with their competitor either when Janet shared the document with David or when David clicked on the embedded link to Company B's website. Such an unintended leakage of an address through an HTTP header is sometimes referred to as a "referer leak."

There exists a need, therefore, to let users of online content management systems to safely share their online content with other users without the fear of accidentally proliferating harmful code or leaking direct links, and thereby the accompanying access privileges, to the content items.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for serving content from an online synchronized content management system through a sandbox domain via a temporary address. An online synchronized content management system may receive a request from a user to access a content item that is stored in the system. The request may be received through an address or a link, such as a URL, directed at an original domain of the online content management system. This address can be a permanent address that is attached to the requested content item. In addition, the system may generate an alternative address associated with the requested content item and present the address to the user. The newly generated address may enable direct access to the requested content item for those who use the address.

Moreover, the alternative address can be a temporary address that is meant to expire after limited use or limited time. For example, the user may be allowed access to the content item only once, twice, or any predetermined number of times, depending on the configuration, and then no longer be able to access the content item once the address expires. In another example, the association between the address and the content item may be maintained only for a limited amount of time, such as a preset number of minutes, hours, days, etc. since the temporary address is created, first accessed, or last accessed.

In addition, when the alternative (i.e., temporary) address is created, or when it is accessed for the first time after creation, the system may generate a unique session identifier ("session ID") for the alternative address. The session ID can be issued to the user that requested access to the content item using the temporary address so that only that user (or her web browser) may be able to access the content item via the temporary address. For example, the session ID can be embedded in a HTTP session cookie and the cookie can be placed in the user's web browser. The next time she attempts to access the content item via the same temporary address, the content management system can verify the session ID contained in the session cookie and determine that she is an authenticated user. The returning user can thus continue to access the content from her web browser while the session cookie remains valid. On the other hand, an unauthorized user (or an unauthorized web browser) could not access the content item merely by knowing the temporary address because the unauthorized user (or the unauthorized web browser) would not have access to the session ID. Therefore, when using the disclosed methods, the threats from any referer leaks can be significantly mitigated.

Moreover, a new and unique temporary address may be created and associated with the requested content item every time the permanent address is accessed by the user or when the previous temporary address expires. The creation of a temporary address can be also triggered by a request to access the content item via the permanent address combined with a predefined query parameter. Prior to generating the temporary address and/or associating the temporary address with the requested content item, the online synchronized content management system can authenticate the requesting user and/or verify the user's access privileges to make sure that the direct-access address is not given out to an unauthorized user. The authentication can be accomplished by verifying the user's credentials, such as username and password, or checking to see whether a valid HTTP session cookie has been saved on the user's web browser.

The temporary addresses may be directed to a sandbox domain that is distinct from the original domain for the online content management system. Thus, when a request to access a content item is received via the temporary address, the content item can be served from the sandbox domain. The relationship between the permanent address and any temporary addresses can be further obfuscated by using a unique string token for each of the temporary addresses, not containing the file name in the temporary addresses, and not retaining the original file structure or storage location for the content item in the temporary addresses.

BRIEF DESCRIPTION OF THE DRAWINGS

The above-recited and other advantages and features of the disclosure will become apparent by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the art will recognize that other components and configurations may be used without departing from the spirit and scope of the disclosure.

The disclosed technology addresses the need in the art for an improved technique for securely serving content from an online synchronized content management system. The above-identified needs for allowing the users to share their online content safely while minimizing harmful effects of malicious code and preventing an address leak can be accomplished by (1) serving content from a sandbox domain separate from the online content management system's main domain, and (2) creating and issuing temporary direct-access addresses for the requested content item and the accompanying session identifiers on a temporary basis, and allowing only limited-number or limited-time access to the requested content.

However, when serving data from a sandbox domain that is distinct from the original domain, the system may no longer be able to identify the user who is requesting the data via the temporary address or verify the user's access privilege, because any user authentication information previously obtained through the original domain may not get transferred over to the sandbox domain. Thus, it may be necessary to perform certain security measures before generating and issuing the temporary address to the requesting user.

Figure 1:
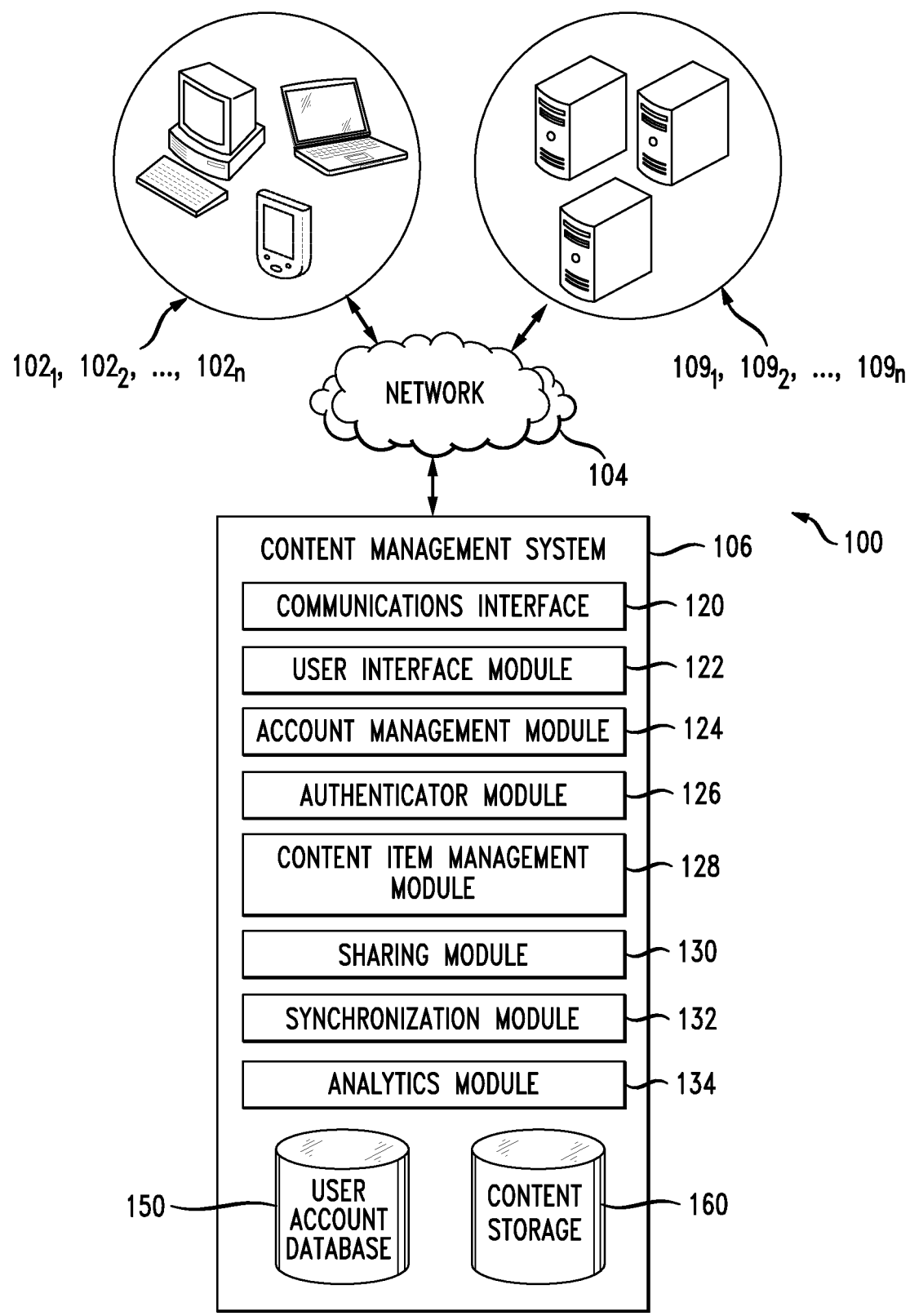
FIG. 1 shows an exemplary content management system configured to communicate with other devices via a network.

With respect to implementing various embodiments of the disclosed technology, an exemplary system configuration 100 is shown in FIG. 1, wherein electronic devices communicate via a network for purposes of exchanging content and other data. The system can be configured for use on a wide area network such as that illustrated in FIG. 1. However, the present principles are applicable to a wide variety of network configurations that facilitate the intercommunication of electronic devices. For example, each of the components of system 100 in FIG. 1 can be implemented in a localized or distributed fashion in a network.

In system 100, a user can interact with content management system 106 through client devices $102_1, 102_2, \ldots, 102_n$ (collectively "102") connected to network 104 by direct and/or indirect communication. Content management system 106 may be also called an online synchronized content management system, an online content management system, a file hosting service, a cloud storage service, a personal cloud service, etc. Online synchronized content management system 106 can support connections from a variety of different client devices, such as desktop computers, mobile computers, mobile communications devices (e.g., mobile phones, smart phones, tablets), smart televisions, set-top boxes, and/or any other network enabled computing devices. Client devices 102 can be of varying type, capabilities, operating systems, etc. Furthermore, content management system 106 can concurrently accept connections from and interact with multiple client devices 102.

A user can interact with content management system 106 via a client-side application installed on client device $102_i$. The client-side application can include a content management system specific component. For example, the component can be a stand-alone application, one or more application plug-ins, and/or a browser extension. However, the user can also interact with content management system 106 via a third-party application, such as a web browser, that resides on client device $102_i$ and is configured to communicate with content management system 106. In either case, the client-side application can present a user interface (UI) for the user to interact with content management system 106. For example, the user can interact with the content management system 106 via a client-side application integrated with the file system or via a webpage displayed using a web browser application.

Content management system 106 can make it possible for a user to store content, as well as perform a variety of content management tasks, such as retrieve, modify, browse, and/or share the content. Furthermore, content management system 106 can make it possible for a user to access the content from multiple client devices 102. For example, client device $102_i$ can upload content to content management system 106 via network 104. The content can later be retrieved from content management system 106 using the same client device $102_i$ or some other client device $102_j$.

To facilitate the various content management services, a user can create an account with content management system 106. The account information can be maintained in user account database 150. User account database 150 can store profile information for registered users. In some cases, the only personal information in the user profile can be a username and/or email address. However, content management system 106 can also be configured to accept additional user information.

User account database 150 can also include account management information, such as account type (e.g. free or paid); usage information (e.g. file edit history); maximum storage space authorized; storage space used; content storage locations; security settings; personal configuration settings; content sharing data; etc. Account management module 124 can be configured to update and/or obtain user account details in user account database 150. The account management module 124 can be configured to interact with any number of other modules in content management system 106.

An account can be used to store content, such as digital data, documents, text files, audio files, video files, etc., from one or more client devices 102 authorized on the account. The content can also include folders or other mechanisms of grouping content items together with different behaviors, such as collections, playlists, albums, etc. For example, an account can include a public folder that is accessible to any user. The public folder can be assigned a web-accessible address. A link to the web-accessible address can be used to access the contents of the public folder. In another example, an account can include a photos folder that is intended for photos and that provides specific attributes and actions tailored for photos; an audio folder that provides the ability to play back audio files and perform other audio related actions; or other special purpose folders. An account can also include shared folders or group folders that are linked with and available to multiple user accounts. The permissions for multiple users may be different for a shared folder.

The content can be stored in content storage 160. Content storage 160 can be a storage device, multiple storage devices, or a server. Alternatively, content storage 160 can be a cloud storage provider or network storage accessible via one or more communications networks. Content management system 106 can hide the complexity and details from client devices 102 so that client devices 102 do not need to know exactly where the content items are being stored by content management system 106. In one variation, content management system 106 can store the content items in the same folder hierarchy as they appear on client device $102_i$. However, content management system 106 can store the content items in its own order, arrangement, or hierarchy. Content management system 106 can store the content items in a network accessible storage (SAN) device, in a redundant array of inexpensive disks (RAID), etc. Content storage 160 can store content items using one or more partition types, such as FAT, FAT32, NTFS, EXT2, EXT3, EXT4, ReiserFS, BTRFS, and so forth.

Content storage 160 can also store metadata describing content items, content item types, and the relationship of content items to various accounts, folders, or groups. The metadata for a content item can be stored as part of the content item or can be stored separately. In one variation, each content item stored in content storage 160 can be assigned a system-wide unique identifier.

Content storage 160 can decrease the amount of storage space required by identifying duplicate files or duplicate segments of files. Instead of storing multiple copies, content storage 160 can store a single copy and then use a pointer or other mechanism to link the duplicates to the single copy. Similarly, content storage 160 can store files more efficiently, as well as provide the ability to undo operations, by using a file version control that tracks changes to files, different versions of files (including diverging version trees), and a change history. The change history can include a set of changes that, when applied to the original file version, produce the changed file version.

Content management system 106 can be configured to support automatic synchronization of content from one or more client devices 102. The synchronization can be platform agnostic. That is, the content can be synchronized across multiple client devices 102 of varying type, capabilities, operating systems, etc. For example, client device $102_i$ can include client software, which synchronizes, via a synchronization module 132 at content management system 106, content in client device $102_i$'s file system with the content in an associated user account. In some cases, the client software can synchronize any changes to content in a designated folder and its sub-folders, such as new, deleted, modified, copied, or moved files or folders. The client software can be a separate software application, can integrate with an existing content management application in the operating system, or some combination thereof. In one example of client software that integrates with an existing content management application, a user can manipulate content directly in a local folder, while a background process monitors the local folder for changes and synchronizes those changes to content management system 106. Conversely, the background process can identify content that has been updated at content management system 106 and synchronize those changes to the local folder. The client software can provide notifications of synchronization operations, and can provide indications of content statuses directly within the content management application. Sometimes client device 102$_i$ may not have a network connection available. In this scenario, the client software can monitor the linked folder for file changes and queue those changes for later synchronization to content management system 106 when a network connection is available. Similarly, a user can manually stop or pause synchronization with content management system 106.

A user can also view or manipulate content via a web interface generated and served by user interface module 122. For example, the user can navigate in a web browser to a web address provided by content management system 106. Changes or updates to content in the content storage 160 made through the web interface, such as uploading a new version of a file, can be propagated back to other client devices 102 associated with the user's account. For example, multiple client devices 102, each with their own client software, can be associated with a single account and files in the account can be synchronized between each of the multiple client devices 102.

Content management system 106 can include a communications interface 120 for interfacing with various client devices 102, and can interact with other content and/or service providers 109$_1$, 109$_2$, . . . , 109$_n$ (collectively "109") via an Application Programming Interface (API). Certain software applications can access content storage 160 via an API on behalf of a user. For example, a software package, such as an app on a smartphone or tablet computing device, can programmatically make calls directly to content management system 106, when a user provides credentials, to read, write, create, delete, share, or otherwise manipulate content. Similarly, the API can allow users to access all or part of content storage 160 through a web site.

Content management system 106 can also include authenticator module 126, which can verify user credentials, security tokens, API calls, specific client devices, and so forth, to ensure only authorized clients and users can access files. Authenticator module 126 may also generate, store, and verify a cryptographic nonce so that a client application and a web browser running on a client device may authenticate each other and establish a secure connection based on a trusted relationship. Further, content management system 106 can include analytics module 134 that can track and report on aggregate file operations, user actions, network usage, total storage space used, as well as other technology, usage, or business metrics. A privacy and/or security policy can prevent unauthorized access to user data stored with content management system 106.

Content management system 106 can include sharing module 130 for managing sharing content publicly or privately. Sharing content publicly can include making the content item accessible from any computing device in network communication with content management system 106. Sharing content privately can include linking a content item in content storage 160 with two or more user accounts so that each user account has access to the content item. The sharing can be performed in a platform agnostic manner. That is, the content can be shared across multiple client devices 102 of varying type, capabilities, operating systems, etc. The content can also be shared across varying types of user accounts.

Content management system 106 can be configured to maintain a content directory identifying the location of each content item in content storage 160. The content directory can include a unique content entry for each content item stored in the content storage.

A content entry can include a content path that can be used to identify the location of the content item in a content management system. For example, the content path can include the name of the content item and a folder hierarchy associated with the content item. For example, the content path can include a folder or path of folders in which the content item is placed as well as the name of the content item. Content management system 106 can use the content path to present the content items in the appropriate folder hierarchy.

A content entry can also include a content pointer that identifies the location of the content item in content storage 160. For example, the content pointer can include the exact storage address of the content item in memory. The content pointer can point to multiple locations, each of which contains a portion of the content item.

In addition to a content path and content pointer, a content entry can also include a user account identifier that identifies the user account that has access to the content item. Multiple user account identifiers can be associated with a single content entry indicating that the content item has shared access by the multiple user accounts.

To share a content item privately, sharing module 130 can be configured to add a user account identifier to the content entry associated with the content item, thus granting the added user account access to the content item. Sharing module 130 can also be configured to remove user account identifiers from a content entry to restrict a user account's access to the content item.

To share content publicly, sharing module 130 can be configured to generate a custom network address or link, such as a URL, which allows any web browser to access the content in content management system 106 without any authentication. A user may share a content item by distributing the associated URL to those with whom she wishes to share the content item. To accomplish this, sharing module 130 can be configured to include content identification data in the generated URL, which can later be used to properly identify and return the requested content item. For example, sharing module 130 can be configured to include the user account identifier and the content path in the generated URL. Upon selection of the URL, the content identification data included in the URL can be transmitted to content management system 106 which can use the received content identification data to identify the appropriate content entry and return the content item associated with the content entry.

In addition to generating the URL, sharing module 130 can be also configured to record that a URL to the content item has been created. The content entry associated with a content item can include a URL flag indicating whether a URL to the content item has been created. For example, the URL flag can be a Boolean value initially set to "0" or "false" to indicate that a URL to the content item has not been created. Sharing module 130 can be configured to change the value of the flag to "1" or "true" after generating a URL to the content item.

Sharing module 130 can be also configured to deactivate a generated URL. For example, each content entry can also include a URL active flag indicating whether the content should be returned in response to a request from the generated URL. For example, sharing module 130 can be configured to only return a content item requested by a generated link if the URL active flag is set to "1" or "true." Thus, access to a content item for which a URL has been generated can be easily restricted by changing the value of the URL active flag. This allows a user to restrict access to the shared content item without having to move the content item or delete the generated URL. Likewise, sharing module 130 can reactivate the expired URL by again changing the value of the URL active flag to "1" or "true." A user can thus easily restore access to the content item without the need to generate a new URL.

Moreover, sharing module 130 can generate two or more custom addresses at a time and associate them with a content item to be shared. Some of the custom addresses can be permanent, while others can be temporary. Permanent URLs typically do not change during the lifetime of the associated content items. On the other hand, temporary URLs may be configured to expire after one-time or limited-time use. The temporary URLs can be based on a sandbox domain that is separately maintained from the original domain on which online synchronized content management system 106 resides. The content entry associated with a content item may include a list of permanent and temporary URLs that have been created and associated with the content item. For the temporary URLs, the content entry may include respective flags to indicate whether a given URL is active or expired. The content entry may also include the time of creation, expiration time, number of accesses, access limit associated with each of the temporary URLs. In some embodiments where the content entries do not include expiration flags, content management system 106 can compare the current time with the stored expiration time to determine whether a corresponding address has expired or not.

Any sharing policy changes on the permanent address may also be applied to the corresponding temporary addresses. For example, if the permanent link or address is disabled, any related temporary links may also be disabled. Therefore, the temporary URLs can be revoked or deactivated, either temporarily or permanently, according to the access control policy changes on the corresponding permanent URLs. As another example, if the access control policy for the permanent address changes from "anyone with the link may access" to "anyone in My Group may access," then the access policy for a related temporary address may also change accordingly. As a result, a user who does not belong to "My Group" may no longer be able to access the content item via the temporary address, whereas another user who does belong to "My Group" may still have the access rights through the temporary address. Additionally, when a user is added or removed from "My Group," the user's ability to access the content via the temporary address may be adjusted accordingly.

While content management system 106 is presented with specific components, it should be understood by one skilled in the art, that the architectural configuration of system 106 is simply one possible configuration and that other configurations with more or less components are also possible.

Figure 2A:
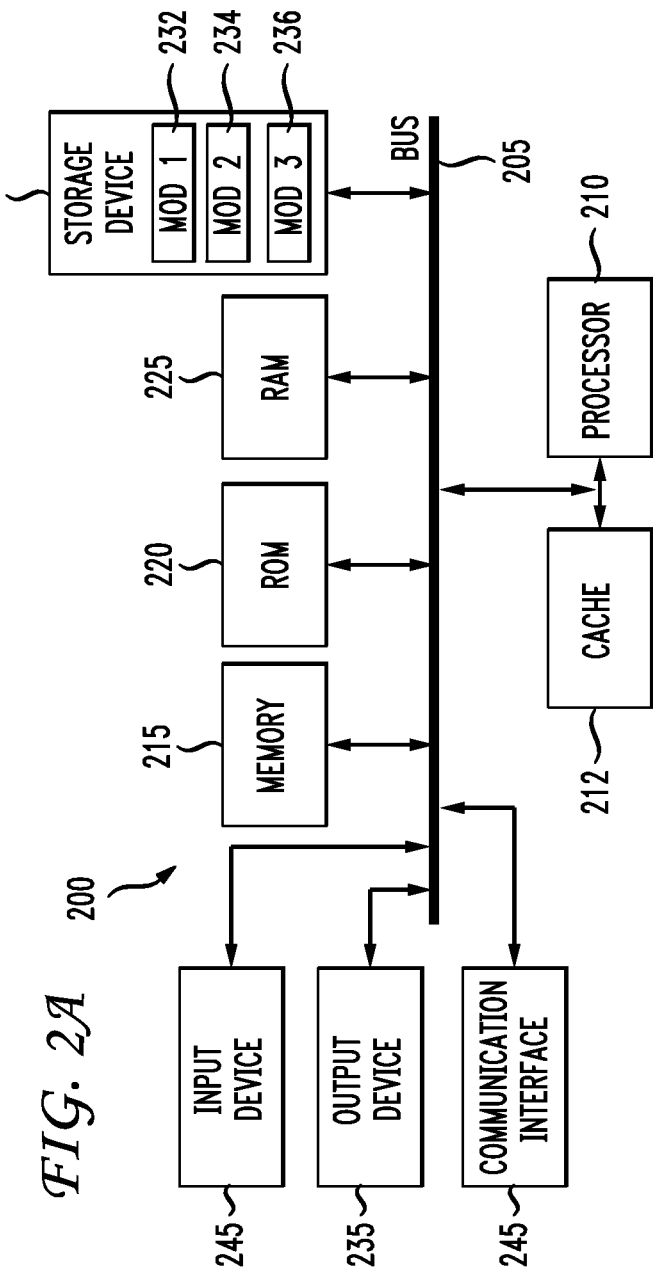
FIG. 2A shows the first exemplary system embodiment for implementing various embodiments of the present technology.
Figure 2B:
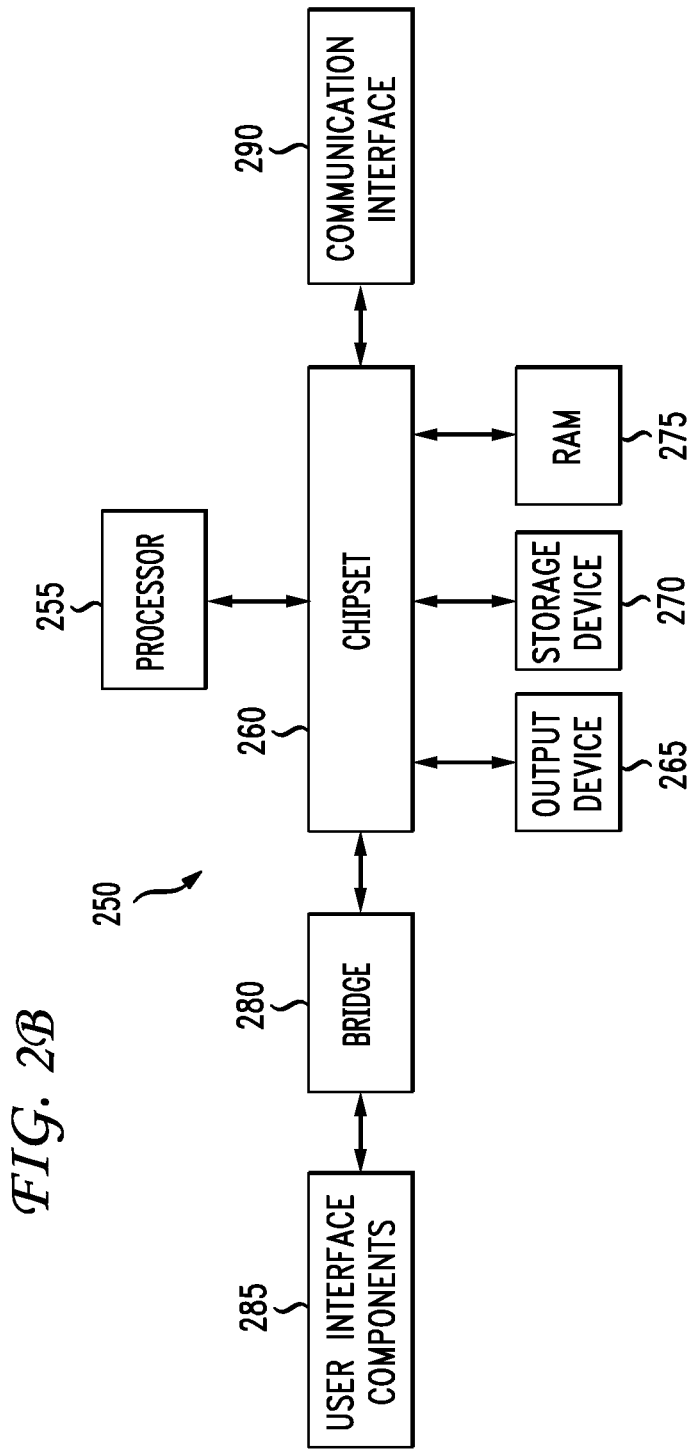
FIG. 2B shows the second exemplary system embodiment for implementing various embodiments of the present technology.

With reference now to FIG. 2A and FIG. 2B, FIG. 2A and FIG. 2B show exemplary possible system embodiments. For example, content management system 106, client devices 102, and/or service providers 109, as shown in FIG. 1, may each be implemented as exemplary system 200 of FIG. 2A or exemplary system 250 of FIG. 2B. The more appropriate embodiment will be apparent to those of ordinary skill in the art when practicing the present technology. Persons of ordinary skill in the art will also readily appreciate that other system embodiments are possible.

FIG. 2A illustrates a conventional system bus computing system architecture 200 wherein the components of the system are in electrical communication with each other using bus 205. Exemplary system 200 includes a processing unit (CPU or processor) 210 and system bus 205 that couples various system components including system memory 215, such as read only memory (ROM) 220 and random access memory (RAM) 225, to processor 210. System 200 can include a cache of high-speed memory connected directly with, in close proximity to, or integrated as part of processor 210. System 200 can copy data from memory 215 and/or storage device 230 to cache 212 for quick access by processor 210. In this way, the cache can provide a performance boost that avoids processor 210 delays while waiting for data. These and other modules can control or be configured to control processor 210 to perform various actions. Other system memory 215 may be available for use as well. Memory 215 can include multiple different types of memory with different performance characteristics. Processor 210 can include any general purpose processor and a hardware module or software module, such as module 1 (232), module 2 (234), and module 3 (236) stored in storage device 230, configured to control processor 210 as well as a special-purpose processor where software instructions are incorporated into the actual processor design. Processor 210 may essentially be a completely self-contained computing system, containing multiple cores or processors, a bus, memory controller, cache, etc. A multi-core processor may be symmetric or asymmetric.

To enable user interaction with computing device 200, input device 245 can represent any number of input mechanisms, such as a microphone for speech, a touch-sensitive screen for gesture or graphical input, keyboard, mouse, motion input, speech and so forth. Output device 235 can also be one or more of a number of output mechanisms known to those of skill in the art. In some instances, multimodal systems can enable a user to provide multiple types of input to communicate with computing device 200. Communications interface 240 can generally govern and manage the user input and system output. There is no restriction on operating on any particular hardware arrangement and therefore the basic features here may easily be substituted for improved hardware or firmware arrangements as they are developed.

Storage device 230 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 225, read only memory (ROM) 220, and hybrids thereof.

Storage device 230 can include software modules 232, 234, 236 for controlling processor 210. Other hardware or software modules are contemplated. The storage device 230 can be connected to system bus 205. In one aspect, a hardware module that performs a particular function can include the software component stored in a computer-readable medium in connection with the necessary hardware components, such as processor 210, bus 205, display 235, and so forth, to carry out the function.

FIG. 2B illustrates computer system 250 having a chipset architecture that can be used in executing the described method and generating and displaying a graphical user interface (GUI). Computer system 250 is an example of computer hardware, software, and firmware that can be used to implement the disclosed technology. System 250 can include processor 255, representative of any number of physically and/or logically distinct resources capable of executing software, firmware, and hardware configured to perform identified computations. Processor 255 can communicate with chipset 260 that can control input to and output from processor 255. In this example, chipset 260 outputs information to output 265, such as a display, and can read and write information to storage device 270, which can include magnetic media, and solid-state media, for example. Chipset 260 can also read data from and write data to RAM 275. A bridge 280 for interfacing with a variety of user interface components 285 can be provided for interfacing with chipset 260. Such user interface components 285 can include a keyboard, a microphone, touch detection and processing circuitry, a pointing device, such as a mouse, and so on. In general, inputs to system 250 can come from any of a variety of sources, machine generated and/or human generated.

Chipset 260 can also interface with one or more communication interfaces 290 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 255 analyzing data stored in storage 270 or 275. Further, the machine can receive inputs from a user via user interface components 285 and execute appropriate functions, such as browsing functions by interpreting these inputs using processor 255.

It can be appreciated that exemplary systems 200 and 250 can have more than one processor 210 or be part of a group or cluster of computing devices networked together to provide greater processing capability.

Figure 3:
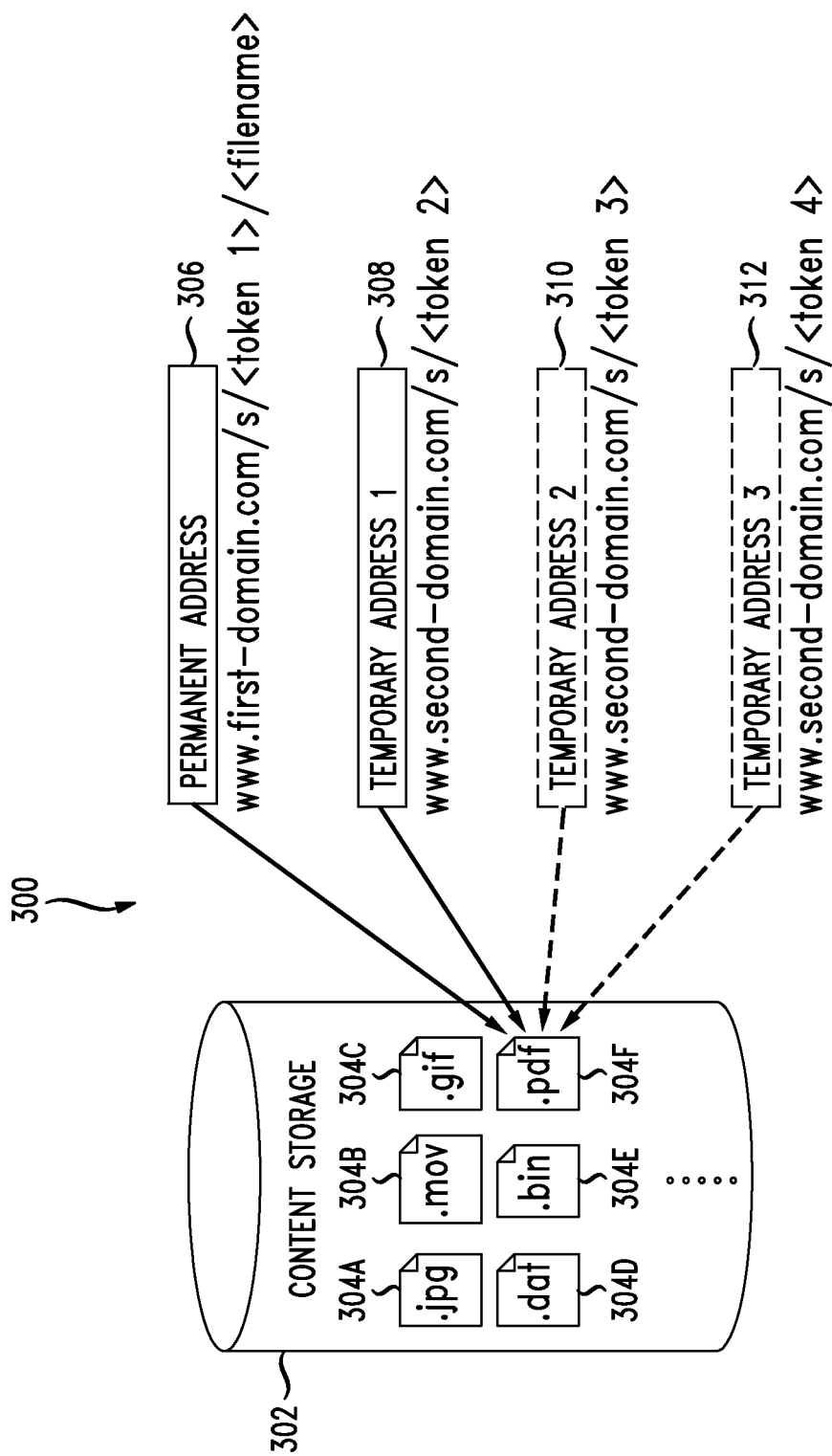
FIG. 3 shows an exemplary content item associated with one or more addresses.

FIG. 3 shows exemplary content items associated with one or more URLs. Content storage 302 shown in FIG. 3 can be content storage 160 of exemplary online synchronized content management system 106, as shown in FIG. 1. Content storage 302 may store various content items 304A-304F (collectively "304"). Content items 304 may be associated with one or more user accounts and accessible to those users with appropriate access privileges. Content items 304 can be digital data, files, or folders of various types, such as a document, binary code, an image, an audio, a video, etc. For example, a content item 304 can be an executable binary with a .exe file extension, a Joint Photographic Experts Group (JPEG)-compressed image file with a .jpg file extension, a portable document format (PDF) document with a .pdf file extension, etc.

Each of content items 304 can have one or more addresses, such as URLs, attached to it. The addresses can be permanent or temporary. A content item 304 typically has one permanent address, although having more than one permanent address may be also permitted. Permanent addresses are linked to content items 304 and the links typically persist throughout the lifetime of respective content items 304. In this regard, permanent address 306 may be considered the original address for PDF document 304F. For example, when PDF document 304F is stored in content storage 302, permanent address 306 can be created for PDF document 304F, and those users who have proper authority to access PDF document 304F can use permanent address 306 to gain access to PDF document 304F. As an example, permanent address 306 can be www.first-domain.com/s/<token 1>/<filename>, where <token 1> and <filename> may be replaced by an appropriate string token and a file name, respectively. <token 1> can be a randomly generated string of alphanumeric and/or symbols that can uniquely identify the associated content item. <token 1> can be a content identifier (ID) for the associated content item. In this example, "first-domain.com" is an exemplary domain from which content item 304F may be served. The exemplary domain "first-domain.com" may be considered the original domain that is associated with content storage 302. One of skill in the art will understand that other domain names can be used instead, such as "dropbox.com."

Although it is possible to link permanent address 306 to content item 304F such that direct access to content item 304F may be granted, alternatively, permanent address 306 may be configured such that no direct access to content item 304F would be allowed. Instead, when the user attempts to access content item 304F via permanent address 306, the online content management system may generate an alternative address, such as temporary address 1 (308), which can allow the user to access content item 304F directly. In other words, temporary address 1 (308) may allow the user (or the user's device and/or application) to exercise ambient authority over content item 304F by simply invoking the address without additional authentication.

In some embodiments, a user requesting access to content item 304F via permanent address 306 can be directed to an intermediary gateway, such as a webpage (not shown), which can then present to the user a temporary address or a link to the temporary address. The temporary address can be directed to a sandbox domain that is set up for the purposes of serving content item 304F. The intermediary gateway may perform user authentication or access privilege verification to make sure that whoever is using permanent address 306 to request access to content item 304F has a user account with appropriate access rights regarding content item 304F. Once successfully authenticated or verified, the requesting user may then be presented with a secondary or alternative address that allows the user to access content item 304F directly. The secondary or alternative address can be a temporary address that may expire after limited-number use (e.g., one-time use) or a limited time period (e.g., one hour after the creation of the temporary address). For example, temporary address 1 (308) can be generated and attached to content item 304F in addition to the already existing permanent address 306. Temporary address 1 (308) can be generated only after the user who is requesting access for content item 304F is properly authenticated and/or her access privilege is verified.

Temporary address 1 (308) may point to a sandbox domain (e.g., "second-domain.com"), which may be separate and independent from the original domain for content storage 302 (e.g., "first-domain.com"), but nevertheless is associated with content storage 302. In other words, both the original domain and the sandbox domain can independently provide access to content on content storage 302. In some embodiments, both the original domain and the sandbox domain may get resolved to the same Internet Protocol (IP) address. In other embodiments, the original domain and the sandbox domain may get resolved to different IP addresses. Serving content from a sandbox domain rather than from the original domain may confer security benefits to synchronized online content management systems. In particular, by using a sandbox domain, the amount of harm that any malicious or ill-designed code embedded in a content item uploaded by a user may cause to the online content management system can be reduced. Using sandbox addresses can also help obscuring the file and folder structure of the original domain as well as the exact content path identifying the location of the content item within the content management system.

Unlike the original domain, the sandbox domain may not have a way to authenticate a user or verify her access privileges. For instance, when a user who is logged into the original domain moves to the sandbox domain, the login information may not automatically get transferred over to the sandbox domain. As a result, the sandbox domain may not be able to identify the user. Thus, in such embodiments, it may be important to authenticate the user at the original domain first and then, and only then, generate a temporary address for the sandbox domain, where the requested content can be served without having to re-authenticate the user.

In this example, temporary address 1 (308) can be www-.second-domain.com/s/<token 2>, where <token 2> may be replaced by an appropriate string token. In some embodiments, the string token <token 2> can be identical to <token 1>, while in some other embodiments, distinct token strings can be used for <token 1> and <token 2> in order to obfuscate the relationship between permanent address 306 and temporary address 1 (308). In other words, if different tokens are chosen for <token 1> and <token 2>, then a user who knows only one address (e.g., a temporary address) and not the other may not be able to guess as to what the other address (e.g., a permanent address) might be. Temporary address 1 (308) may also contain filename (e.g., www.second-domain.com/s/<token 2>/<filename>), although one of skill in the art will understand that <filename> can be removed to further obfuscate the relationship between temporary address 1 (308) and permanent address 306. In some embodiments, appending a query parameter to the permanent address in a request can redirect the request to a temporary address. For example, if the request includes a predefined query parameter, such as "d1=1" attached to the permanent address, the request can be redirected to a newly generated temporary address. The temporary address can be freshly and uniquely generated each time the request with the query parameter attached to the permanent address is received.

Content item 304F may be associated with additional temporary addresses such as temporary address 2 (310), temporary address 3 (312), etc. Although the system may be configured such that only one temporary address is active (i.e., links to content item 304F) at any given time (active or unexpired links are shown in FIG. 3 as boxes with a solid border), one of skill in the art will recognize that in some embodiments, two or more temporary address can be active at the same time, especially during a transitional period in which one or more temporary addresses are about to expire and new temporary address(es) are being generated. Many of the principles and characteristics described above regarding temporary address 1 (308) may also apply to additional temporary addresses such as temporary address 2 (310) and temporary address 3 (312).

In some embodiments, temporary address 2 (310) can be generated and/or activated to replace temporary address 1 (308) after temporary address 1 (308) has expired (i.e., deactivated) and is no longer associated with content item 304F. Such disassociation can occur when access limit or time limit has run out for content item 304F. For example, if content item 304F is configured for one-time access via temporary address 1 (308), then temporary address 1 (308) may expire after a user accesses content item 304F through temporary address 1 (308) once. The next time the user requests access to content item 304F via permanent address 306, a new temporary address, such as temporary address 2 (310) may be created and associated with content item 304F. Optionally, user authentication and/or privilege verification may be performed again before issuing each additional temporary address. The user can then use temporary address 2 (310) to directly access (e.g., download) content item 304F. Similarly, after temporary address 2 (310) expires, yet another temporary address, such as temporary address 3 (312) can be created for direct access to content item 304F. Temporary addresses 308, 310, 312 may each be distinct from one another, for example, by having a unique string token in the URL. Thus, in the example shown in FIG. 3, <token 2>, <token 3>, and <token 4> may all be distinct from one another in order prevent an expired address from being reused. It is to be further noted, as those of ordinary skill in the relevant art will recognize, that permanent address 306, temporary address 1 (308), temporary address 2 (310), temporary address 3 (312), etc. may each have different domain names, port numbers, resource paths, file names, etc. than what is shown in FIG. 3.

When a temporary address, such as temporary address 1 (308), temporary address 2 (310), or temporary address 3 (312), is generated, the content management system may also store a mapping from the temporary address to some data including (1) the corresponding permanent address, such as permanent address 306, (2) the user account identifier of any user(s) currently logged in, (3) an expiration time for the temporary address, (4) a session ID for the temporary address, and other relevant information. Subsequently, when a user navigates to the temporary address, the content management system can use this stored mapping information to look up the permanent address, and also to determine, based on the access control policy for the permanent address, whether the recorded user accounts have access to the permanent address, assuming that the request is received from a person whose user account identifier is mapped to the temporary address.

In some embodiments, temporary addresses 308, 310, 312 can be unique and not recyclable. In other words, once a temporary address expires, that address may never be used again to access content item 304F. This way, the online content management system can prevent unintended access from an unauthorized and/or malicious user who may have obtained an expired address or from a previously authorized user whose access rights have since been revoked. Even if the temporary address has not expired yet, the unauthorized user's access to the content would be limited by the temporary nature of the address. In other words, the unauthorized access would be limited to only one-time or limited-time access.

Figure 4:
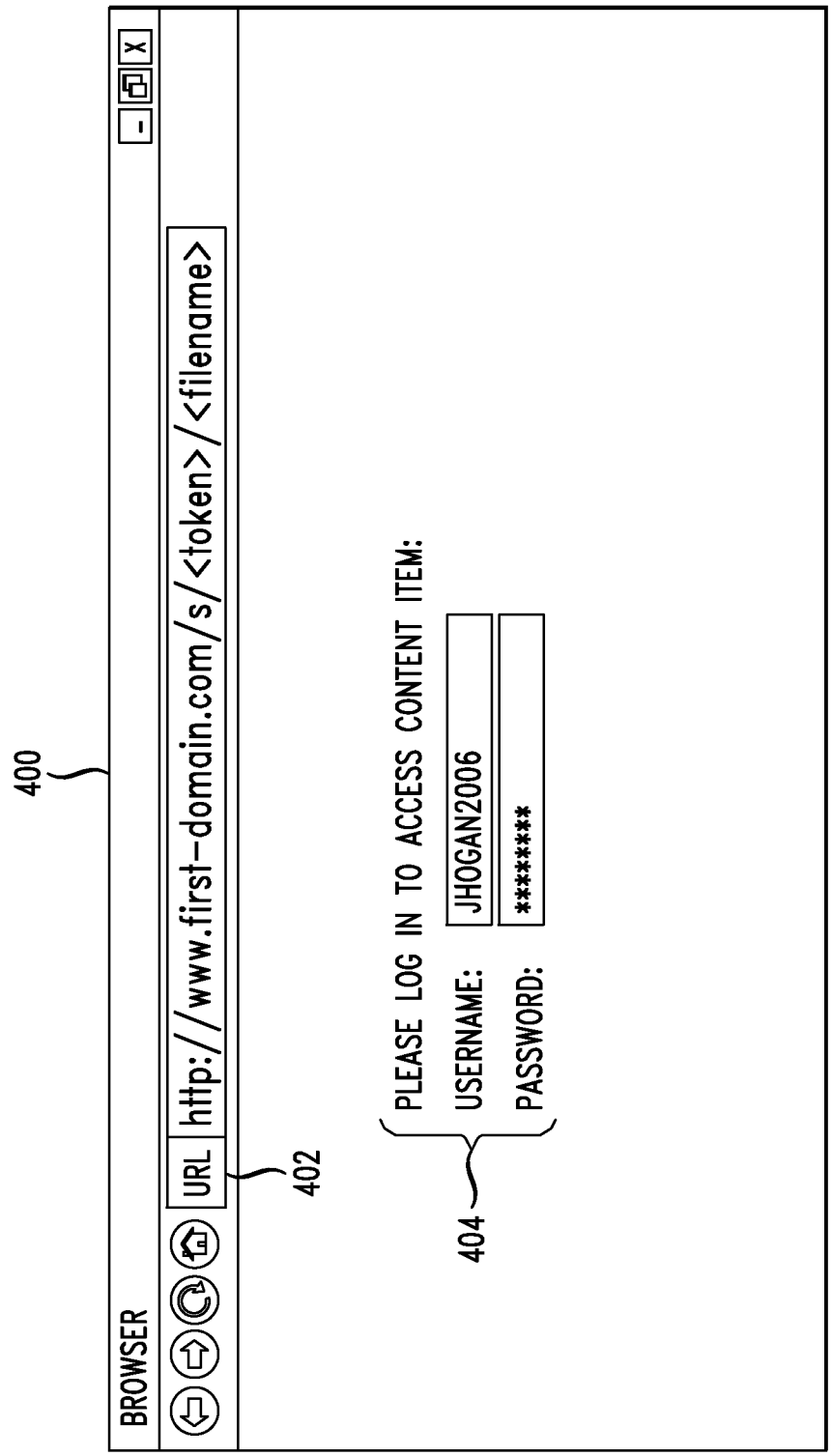
FIG. 4 shows an exemplary webpage that authenticates a user prior to accessing the content item.

FIG. 4 shows an exemplary webpage that authenticates a user prior to accessing the content item. Webpage 400 can be an intermediary gateway that the online content management system directs a user to when the user tries to gain access to a content item via permanent address 402. Once at webpage 400, the requesting user can be given a direct address, such as temporary address 512 as described below, to the requested content item. However, since a direct address may grant the user ambient authority over the content item associated with the address, it may be necessary to authenticate the user and/or verify the user's access rights before issuing the direct address to the user. In FIG. 4, the user requesting access to a content item by visiting URL 402 is met with user authentication request 404. The user may enter his username and password to prove to the online content management system that he is authorized to access the content. Alternatively, if the user has already logged into the system prior to visiting URL 402, then the system can use a session cookie, such as a hypertext transfer protocol (HTTP) cookie, stored inside the user's web browser to authenticate the user.

If the online content management system determines that the credentials provided by the user do not correspond with a valid user registered with the system and/or the entered user account does not have a proper privilege to access the requested content item, the system may deny the user's access to the content item. Thus, webpage 400 may notify the user that the access has been denied and suggest reentering the user's login information. In such a situation, no direct temporary address for the content item may be created and/or issued to the user via webpage 400. Consequently, the user would be barred from accessing the content item.

Figure 5:
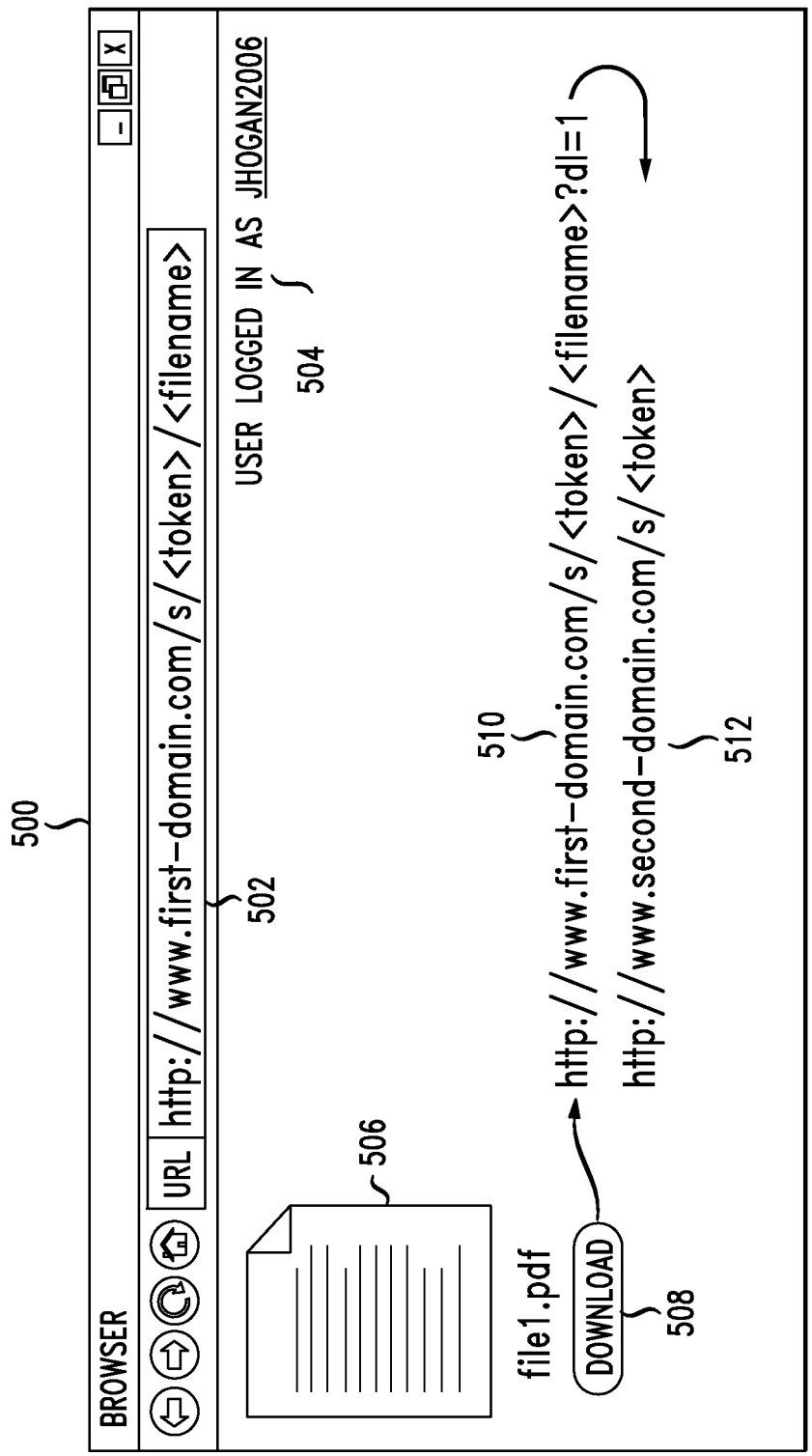
FIG. 5 shows an exemplary webpage allowing a user to access the content item via an alternative address.

FIG. 5 shows an exemplary webpage granting a user to access the content item via an alternative URL. Once the user is properly authenticated and/or his access privileges are verified with regards to the requested content item, as shown in FIG. 4, the system may serve to the user, webpage 500 that represents an intermediary gateway. The gateway webpage 500 may be served from the original domain of the online content management system accessed via permanent address 502. Webpage 500 may also indicate that the user is currently logged into the system (504). The requested content item may be represented on webpage 500 as graphical element 506, which can be a text, an icon, a thumbnail, or a preview. The filename or identifier (e.g., "file1.pdf") for the content item may be also displayed alongside graphical element 506. Webpage 500 may also contain access link 508 for the content item. Access link 508, for example in the form of a download button, may provide a direct link to the content item whereby the user may access link 508 to directly access the content item without further authentication. Link 508 can be associated with the permanent address to the content item combined with a query parameter, such as "d1=1" (510). When the user accesses link 508, then temporary address 512 can be generated and the request can be redirected to temporary address 512. Alternatively, temporary address 512 can be pre-generated prior to the user accessing link 508, for example, after the user is authenticated. Temporary address 512 can be directed to a sandbox domain, such as "second-domain.com." Temporary address 512 can contain the same token string as permanent address 502, as shown in FIG. 5. Alternatively, temporary address 512 can contain a token that is distinct from the one contained in permanent address 502.

Temporary address 512 may allow a web browser to access the associated content item. The access can be granted with or without authentication. The user may share the content item by distributing temporary address 512 to those with whom he wishes to share the content item. Alternatively, temporary address 512 can be included in a document, such as an HTML document, an Extensible Markup Language (XML) document, a PDF document, etc., to embed the content item inside the document or provide an interactive access link to the content item.

When temporary address 512 is accessed for the first time, the content management system may generate a session ID for temporary address 512. Session ID can be a randomly generated value, such as a 128-bit alphanumeric string, that is unique to temporary address 512 and computationally difficult to guess. After the system generates the session ID, the system can issue the session ID to the user who requested access to the content item using temporary address 512. By issuing the session ID to only one user (i.e., the user who accessed temporary address 512 for the first time since temporary address 512 was generated) and only allowing access to the corresponding content item to one who can provide temporary address 512 and the session ID, the system can guarantee that access to the content item via temporary address 512 will be available to only one user.

In some embodiments, the issuance of the session ID can be accomplished by simply transmitting the session ID to the requesting client device. The client device can then save the session ID for future authentication. In some other embodiments, however, the session ID can be issued by placing a session cookie in the requesting user's web browser with the session ID inside the cookie. For added security, the cookie may be set with an "HttpOnly" attribute to mitigate the risk of unauthorized access through cross-site scripting. In addition, the cookie can be configured to be placed in the client's web browser only when the cookie does not already exist in the browser in order to ensure that the session ID is issued only when it is the first time that temporary address 512 is being accessed. Furthermore, the cookie may be set to have a browser session length to make sure that the access is not granted on a permanent basis or for an overly long period of time. The system may choose not to store the cookie server-side to increase security.

Once the session ID has been generated and issued to a user, any subsequent requests for access to the content item through temporary address 512 can be authenticated with the session ID. In particular, the content management system may first verify that the requesting client is in possession of the session ID before serving the content item. This can ensure that any rogue web browser that may be using a leaked URL to gain access to the content item will be thwarted because such web browser would not have access to a session cookie with the appropriate session ID. If the requesting web browser cannot produce the correct session ID for temporary address 512, then the system may disallow access to the content item.

In some embodiments, access link 508 may be linked to temporary address 512. In such embodiments, temporary address 512 may be uniquely generated and associated with the requested content item each time intermediary gateway 500 is accessed via permanent address 502. In other embodiments, temporary address 512 may not be renewed unless it expires through other means. Depending on the configuration of the online content management system, temporary address 512 may expire when it is accessed once, when it is accessed a predetermined number of times (e.g., five times), when a predetermined amount of time elapses after temporary address 512 is generated, when a predetermined amount of time elapses after temporary address 512 is first accessed, when a predetermined amount of time elapses after temporary address 512 is last accessed, or any combination thereof. The expiration of temporary address 512 can be achieved by setting the browser session length in the session cookie when the session ID is issued to a client web browser.

For example, an online content management system may be configured such that temporary address 512 would expire one hour after the content item is accessed for the third time via temporary address 512. Once the content item is accessed three times via temporary address 512 and one hour passes following the third access, requesting content via temporary address 512 may no longer return any data from the online content management system. Instead, the user may be presented with an error message explaining that the address link has expired and asked to re-enter user credentials to log in to the original domain (e.g., "first-domain.com"). Upon re-authentication of the user, a new temporary address can be created and associated with the content item. Alternatively, the creation and association the new address can take place after the user interacts with access link 508 to the permanent address with a predefined query parameter (510). When the online content management system receives a request via a sandbox address, such as temporary address 512, the system may return the content item to the user from the sandbox domain associated with temporary address 512.

In some embodiments, temporary address 512 may be associated with more than one expiration timer. For instance, the expiration time can be set in terms of the time between the creation of the address and its first access. For example, if the expiration timer of 50 minutes is set for the time between the creation and access, and the temporary address is created at 12:52, then the user must access the content item via the temporary address by 13:42 lest the temporary address expires and becomes inaccessible. In conjunction with, or irrespective of, the above-mentioned expiration timer, another type of timer may be set in terms of the time since the first access. For example, the online content management system can be configured to disassociate any temporal addresses from their respective content items two hours after the content items are first accessed. Thus, if a temporary sandbox address was created at 17:30 and accessed for the first time at 19:48, then the address would expire at 21:48. An expiration timer can be set in terms of yet another type of time such as the time since the last access. With this type of timer, the expiration time would be renewed and reset every time the temporary address is accessed. For example, if the temporary address is configured to expire 30 minutes after the last access, and the address was last accessed at 4:17, it would expire at 4:47 unless it is accessed again between 4:17 and 4:47, at which time the expiration time would be reset to the time 30 minutes in the future. One of skill in the art will understand that other types of expiration timers may be contemplated and one or more expiration timers of the same or different types may be used in combination.

The expiration, deactivation, or revocation of temporary address 512 can also be linked with the access control policy associated with permanent address 510. In other words, any changes in access control policy for permanent address 510 may have an effect on whether temporary address 512 is currently active or not. For example, if the user terminates sharing content item through permanent address 510, access rights to the content item through temporary address 512 may also be similarly restricted. The effect on temporary address 512 can be dynamic and automatic, in that temporary address 512 can be activated and deactivated according to the access control policy of permanent address 510 without any further interactions or directions from the user.

Figure 6:
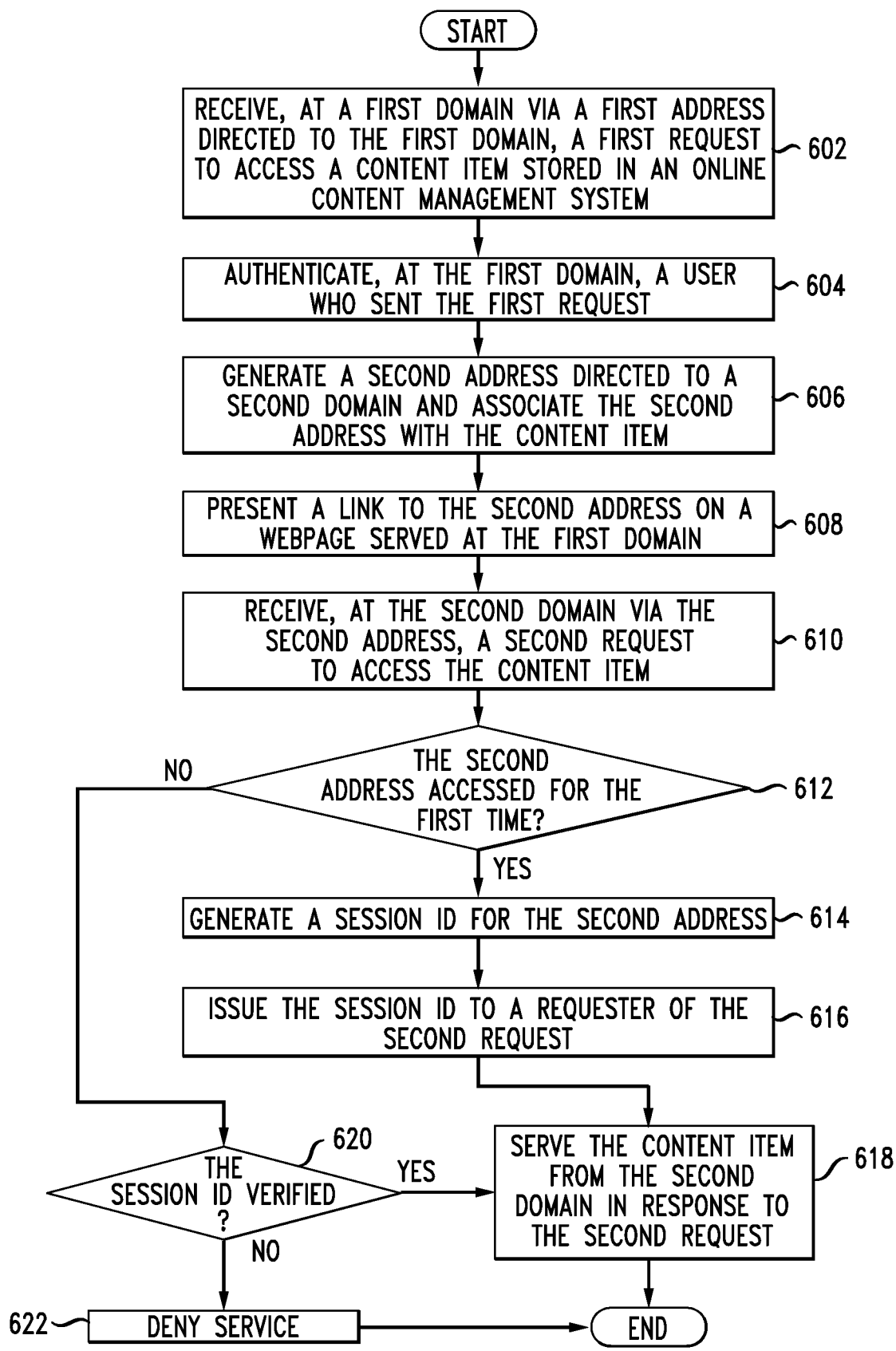
FIG. 6 shows an exemplary method embodiment.
Figure 7:
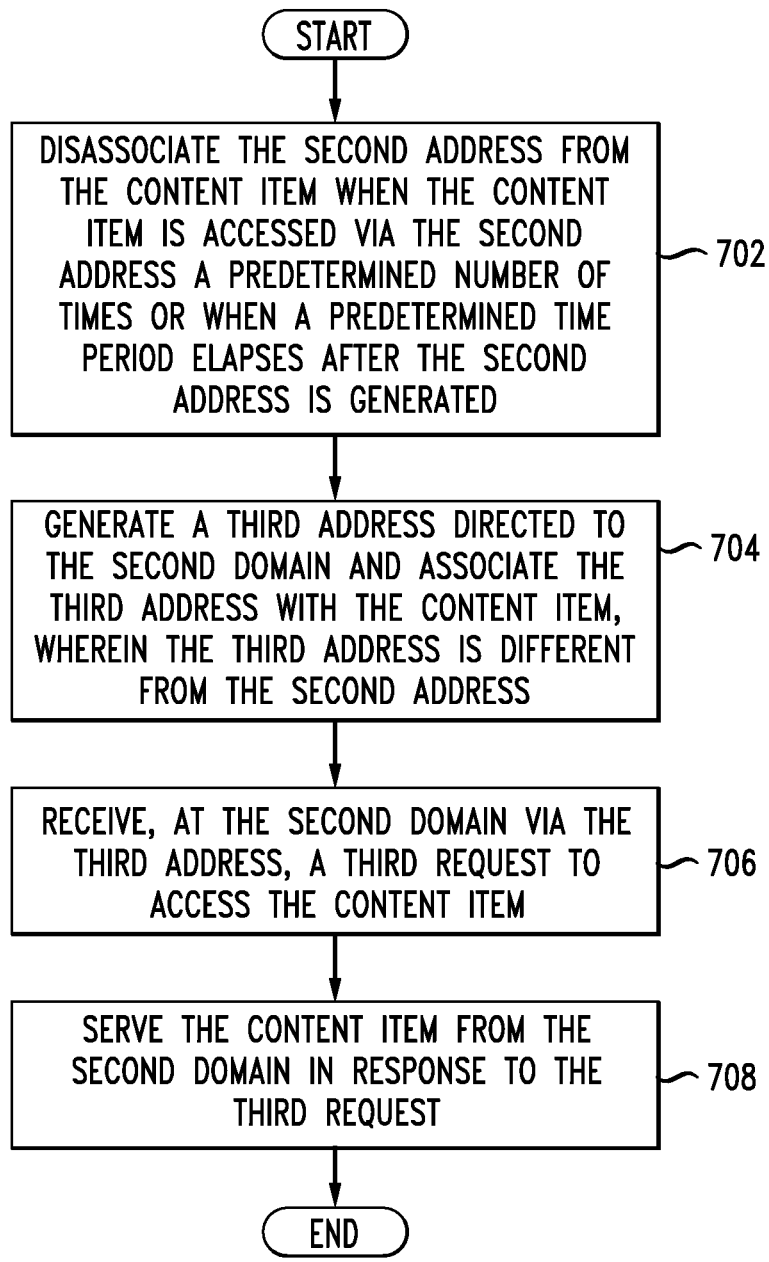
FIG. 7 shows another exemplary method embodiment.

Having disclosed some basic system components and concepts, the disclosure now turns to the example method embodiments shown in FIGS. 6-7. For the sake of clarity, the methods are described in terms of system 200, as shown in FIG. 2A, configured to practice the method. Alternatively, the methods can be practiced by client device 102$_i$, service provider 109$_i$, or online content management system 106, as shown in FIG. 1; system 250 as shown in FIG. 2B; or content storage 302, as shown in FIG. 3. The steps outlined herein are exemplary and can be implemented in any combination thereof in any order, including combinations that exclude, add, or modify certain steps.

FIG. 6 shows an exemplary method embodiment. System 200 may receive, at a first domain via a first address directed to the first domain, a first request to access a content item stored in an online content management system (602). The first address may be a URL. In some embodiments, the first request may be received via a first link in lieu of the first address. The content item may be not directly accessible via the first address. System 200 may then authenticate, at the first domain, a user who sent the first request (604). Authenticating the user may include verifying user credentials. Alternatively, authenticating the user may include verifying a session cookie. System 200 may generate a second address directed to a second domain and associate the second address with the content item (606). The second address can be a URL. The second address can be a second link. The second domain may be a sandbox domain. In some embodiments, the second address may be generated only when the user is successfully authenticated. Moreover, the second address can include a randomly generated token. The second address can be uniquely generated each time a request to access the content item via the first address is received. System 200 may present a link to the second address on a webpage served at the first domain (608). Alternatively, system 200 may generate a permanent link to the first domain based on the permanent link's token. The permanent link can be associated, for example, with a download link. When the link is accessed, system 200 may check the user's credentials, generate a temporary link on the second domain, and redirect to the temporary link. By generating the temporary link when the download link is accessed, rather than when the webpage is served, the user can access the requested content item even when the download link is accessed an extended period of time after the webpage is loaded on to the web browser without having to worry about the temporary link going stale (i.e., expire).

System 200 can then receive, at the second domain via the second address, a second request to access the content item (610). The second request can originate from the same user that sent the first request, but does not have to. In other words, the second request can come from a different user than the user who requested the first request. For example, the user who sent the first request may share the second address with a different user and the second user can send the second request to system 200. The second request may be received from a client device. In some embodiments, instead of receiving the second request via the second address, system 200 can receive the second request via the first address combined with a predefined query parameter. In such a case, system 200 can then redirect the second request to the second address.

The second address can be configured to expire after the content item is accessed via the second address a predetermined number of times. The second address can also be configured to expire when a predetermined time period elapses after the second address is generated. Moreover, the second address (or link) can be disassociated from the content item when a predetermined time period elapses (i) since the second address is generated, (ii) since the second address is associated with the content item, (iii) since the second address is accessed for the first time, or (iv) since the second address is accessed for a last time.

After receiving the second request, system 200 can determine whether the second address is being accessed for the first time or not since the second address was generated (612). If it is indeed the first time that the second address is being accessed, then system 200 can generate a session ID for the second address (614), issue the session ID to a requester of the second request (616), and serve the content item from the second domain in response to the second request (618). The session ID can be a randomly generated value that is unique to the second address. In addition, the session ID can be issued by placing a session cookie in a web browser associated with the requester of the second request. The session cookie can contain the session ID. If, however, the second address is being accessed for the second time or any subsequent times, such as when system 200 receives, at the second domain via the second address, a third request to access the content item, system 200 may attempt to verify the session ID (620). System 200 can accomplish this by checking to see whether the requester of the second request (e.g., the client device) is in possession of the session ID. Alternatively, system 200 may determine whether the session ID is also received from the requester. This can be verified by determining whether the requester has a session cookie that contains the session ID. If the session ID is properly verified, then system 200 can serve the content item from the second domain in response to the second request (618). On the other hand, if the session ID cannot be verified, then system 200 may deny service of the content item in response to the request.

FIG. 7 shows another exemplary method embodiment. System 200 may disassociate the second address from the content item when the content item is accessed via the second address a predetermined number of times or when a predetermined time period elapses after the second address is generated (702). System 200 may generate a third address directed to the second domain and associate the third address with the content item, wherein the third address is different from the second address (704). However, in some embodiments, the third address can be generated and associated with the content item without disassociating the second address from the content item first. For example, the third address may be generated by anyone with access to the content item, including the same person who requested the second address by accessing the same permanent link (e.g., via another instance or tab of the web browser). System 200 may then receive, at the second domain via the third address, a third request to access the content item (706). System 200 can serve the content item from the second domain in response to the third request (708).

For clarity of explanation, in some instances the present technology may be presented as including individual functional blocks including functional blocks comprising devices, device components, steps or routines in a method embodied in software, or combinations of hardware and software.

The computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims. Thus, the claims are not intended to be limited to the aspects shown herein, but are to be accorded the full scope consistent with the language claims, wherein reference to an element in the singular is not intended to mean "one and only one" unless specifically so stated, but rather "one or more."

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs. Moreover, claim language reciting "at least one of" a set indicates that one member of the set or multiple members of the set satisfy the claim.

What is claimed is:

1. A method comprising:
   receiving, at a first domain via a first address directed to the first domain, a first request to access a content item stored in a content management system;
   determining whether to serve the content item from the first domain based on a first access privilege associated with the content item at the first domain;
   generating a second address directed to a second domain;
   associating the second address and the first access privilege with the content item;
   receiving, at the second domain via the second address, a second request to access the content item;
   serving, based on a verification of the first access privilege, the content item from the second domain in response to the second request received via the second address; and disassociating the second address with the content item, wherein access to the content item via the first address is unaffected.

2. The method of claim 1, further comprising:
upon receiving the first request, authenticating, at the first domain, a user who sent the first request, wherein the second address is generated only when the user is successfully authenticated.

3. The method of claim 1, further comprising:
after receiving the second request, generating a session identifier for the second address; and
issuing the session identifier to a requester of the second request.

4. The method of claim 3, wherein the session identifier is a randomly generated value.

5. The method of claim 3, wherein the session identifier is issued by placing a session cookie in a web browser associated with the requester of the second request, the session cookie comprising the session identifier.

6. The method of claim 3, further comprising:
after issuing the session identifier, receiving, at the second domain via the second address, a third request to access the content item; and
serving the content item from the second domain in response to the third request when the session identifier is also received from a requester of the third request.

7. The method of claim 3, further comprising:
after issuing the session identifier, receiving, at the second domain via the second address, a third request to access the content item; and
denying service of the content item in response to the third request when the session identifier is not received from a requester of the third request.

8. The method of claim 1, further comprising:
after generating the second address, presenting a link to the second address on a webpage served at the first domain.

9. The method of claim 1, wherein the second address is configured to expire after the content item is accessed via the second address a predetermined number of times.

10. The method of claim 1, wherein the second address is configured to expire when a predetermined time period elapses after the second address is generated.

11. The method of claim 1, wherein the second domain is a sandbox domain.

12. The method of claim 1, further comprising:
disassociating the second address from the content item when the content item is accessed via the second address a predetermined number of times or when a predetermined time period elapses after the second address is generated;
generating a third address directed to the second domain and associating the third address with the content item, wherein the third address is different from the second address; and
receiving, at the second domain via the third address, a third request to access the content item; and
serving the content item from the second domain in response to the third request.

13. A system comprising:
at least one processor; and
a non-transitory computer-readable storage medium storing instructions which, when executed by the at least one processor, cause the at least one processor to perform operations comprising:
receiving, at a first domain via a first uniform resource locator (URL) directed to the first domain, a first request to access a content item stored in the system;
determining whether to serve the content item from the first domain based on an access privilege associated with the content item at the first domain;
generating a second URL directed to a second domain and associating the second URL with the content item;
receiving a second request to access the content item via the first URL combined with a predefined query parameter;
redirecting the second request to the second URL;
serving the content item from the second domain in response to the second request; and
disassociating the second URL with the content item, wherein access to the content item via the first URL is unaffected.

14. The system of claim 13, the non-transitory computer-readable storage medium storing additional instructions which, when executed by the at least one processor, cause the at least one processor to perform further operations comprising:
after receiving the second request, generating a session identifier for the second URL;
receiving, at the second domain via the second URL, a third request to access the content item; and
serving the content item from the second domain in response to the third request only when the session identifier is also received from a requester of the third request.

15. The system of claim 13, wherein the non-transitory computer-readable storage medium stores additional instructions which, when executed by the at least one processor, cause the at least one processor to perform further operations comprising:
disassociating the second URL from the content item after the content item is accessed via the second URL a predetermined number of times or when a predetermined period of time elapses after the second URL is generated.

16. A non-transitory computer-readable storage device storing instructions which, when executed by at least one processor, cause the at least one processor to perform operations comprising:
receiving, at a first domain via a first link directed to the first domain, a first request associated with a content item stored in a content management system;
determining, in response to the first request, an access privilege to the content item at the first domain and generating a second link directed to a second domain and associating the second link with the content item;
receiving, at the second domain via the second link, a second request from a client device, the second request being associated with the content item;
when it is determined that the second link is being accessed for a first time since the second link was generated:
generating a session identifier for the second link;
issuing the session identifier to the client device; and
serving the content item from the second domain to the client device in response to the second request; and
when it is determined that the second link is not being accessed for the first time since the second link was generated:

serving the content item from the second domain to the client device in response to the second request only when the client device is in possession of the session identifier; and disassociating the second link with the content item, wherein access to the content item via the first link is unaffected.

17. The non-transitory computer-readable storage device of claim 16, wherein the second link is disassociated from the content item when a predetermined time period elapses (i) since the second link is generated, (ii) since the second link is associated with the content item, (iii) since the second link is accessed for the first time, or (iv) since the second link is accessed for a last time.

18. The non-transitory computer-readable storage device of claim 16, wherein the second link is disassociated from the content item when the content item is served via the second link a predetermined number of times.

19. The non-transitory computer-readable storage device of claim 16, wherein the second link is uniquely generated each time the first request is received via the first link.

20. The non-transitory computer-readable storage device of claim 16, wherein the content item is not directly accessible via the first link.

* * * * *